(12) United States Patent
Fei

(10) Patent No.: US 10,747,542 B2
(45) Date of Patent: Aug. 18, 2020

(54) LOAD STORE DEPENDENCY PREDICTOR USING SEPARATE ALIAS TABLES FOR STORE ADDRESS INSTRUCTIONS AND STORE DATA INSTRUCTIONS

(71) Applicant: Shanghai Zhaoxin Semiconductor Co., Ltd., Shanghai (CN)

(72) Inventor: Xiaolong Fei, Beijing (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 59 days.

(21) Appl. No.: 16/109,713

(22) Filed: Aug. 22, 2018

(65) Prior Publication Data
US 2019/0370000 A1   Dec. 5, 2019

(30) Foreign Application Priority Data

Jun. 5, 2018 (CN) .......................... 2018 1 0568756

(51) Int. Cl.
*G06F 9/38* (2018.01)
*G06F 9/30* (2018.01)
*G06F 12/0875* (2016.01)

(52) U.S. Cl.
CPC ........ *G06F 9/3838* (2013.01); *G06F 9/30043* (2013.01); *G06F 9/3842* (2013.01); *G06F 9/3855* (2013.01); *G06F 12/0875* (2013.01); *G06F 2212/452* (2013.01)

(58) Field of Classification Search
CPC .............................. G06F 9/3838; G06F 9/3842
See application file for complete search history.

(56) References Cited

U.S. PATENT DOCUMENTS

| | | | | |
|---|---|---|---|---|
| 10,437,595 | B1* | 10/2019 | Kanapathipillai .. | G06F 9/30145 |
| 2006/0095734 | A1* | 5/2006 | Filippo .................. | G06F 9/3838 712/218 |
| 2010/0306507 | A1* | 12/2010 | Day ....................... | G06F 9/3834 712/216 |
| 2011/0040955 | A1* | 2/2011 | Hooker ............... | G06F 9/30043 712/225 |
| 2013/0298127 | A1* | 11/2013 | Meier ................... | G06F 9/3834 718/100 |
| 2013/0326198 | A1* | 12/2013 | Meier ................... | G06F 9/3834 712/216 |
| 2014/0380022 | A1* | 12/2014 | Troester ................ | G06F 9/3826 712/216 |
| 2018/0081688 | A1* | 3/2018 | Fei ....................... | G06F 9/30043 |

FOREIGN PATENT DOCUMENTS

CN        106406822        2/2017

* cited by examiner

*Primary Examiner* — Jacob Petranek
(74) *Attorney, Agent, or Firm* — JCIPRNET

(57) ABSTRACT

A processor circuit and an operation method thereof are provided. The processor circuit includes a first alias queue module, a second alias queue module, and a pattern detection module. The pattern detection module is coupled to the first alias queue module and the second alias queue module. When a next sequential instruction pointer value of a store data instruction of the first alias queue module is matched, and a next sequential instruction pointer value of a store address instruction of the second alias queue module is matched, the pattern detection module determines that the load instruction depends on the store data instruction or the store address instruction according to a pattern value corresponding to the store data instruction.

20 Claims, 7 Drawing Sheets

LOAD STORE DEPENDENCY PREDICTOR USING SEPARATE ALIAS TABLES FOR STORE ADDRESS INSTRUCTIONS AND STORE DATA INSTRUCTIONS

CROSS-REFERENCE TO RELATED APPLICATION

This application claims the priority benefit of China application serial no. 201810568756.4, filed on Jun. 5, 2018. The entirety of the above-mentioned patent application is hereby incorporated by reference herein and made a part of this specification.

BACKGROUND OF THE INVENTION

1. Field of the Invention

The present disclosure relates to a processor, in particular to a processor circuit and an operation method thereof.

2. Description of Related Art

In an out-of-order execution of an out-of-order processor, a load instruction and a store instruction may be executed out-of-order to reduce influence of a delay or improve performance of the processor. However, since an operation of the store instruction may modify data to affect a subsequent operation of the load instruction, a memory violation frequently occurs. The memory violation, which is also called load miss, refers to that correct data may not be loaded by the load instruction because the load instruction is dispatched to an execution unit for execution before the store instruction. Therefore, the memory violation of instruction replay may occur to the out-of-order processor. In addition, the store instruction may further be divided into a store data (StD) instruction and a store address (StA) instruction. When iterations of different loops are alternately executed, if the load instruction mistakenly depends on the StD instruction or the StA instruction, instruction replay may reoccur to cause a load miss. In view of this, how to accurately predict interdependency of the load instruction and the store instruction to further effectively reduce memory violations of instruction replay and load miss, a plurality of solutions will be proposed below.

SUMMARY OF THE INVENTION

The present disclosure provides a processor circuit and an operation method thereof, which may effectively reduce a condition of load miss caused by instruction replay and may also accurately predict dependency of a load instruction and a store instruction causing a memory violation.

A processor circuit of the present disclosure includes a first alias queue (AQ) module, a second AQ module and a pattern detection module. The first AQ module includes a plurality of first entries. One of the plurality of first entries includes a first field and a plurality of second fields configured to record respective next sequential instruction pointer (Nsip) values of load instruction and StD instruction respectively and configured to record a pattern value corresponding to the StD instruction. The second AQ module includes a plurality of second entries. One of the plurality of second entries includes a third field and a plurality of fourth fields configured to store the respective Nsip values of the load instruction and StA instruction respectively. The pattern detection module is coupled to the first AQ module and the second AQ module. When the Nsip value of the StD instruction of the first AQ module is matched and the Nsip value of the StA instruction of the second AQ module is matched, the pattern detection module determines that the load instruction depend on the StD instruction or the StA instruction according to the pattern value corresponding to the StD instruction.

An operation method of the present disclosure is applied to a processor circuit. The processor circuit includes a first AQ module, a second AQ module and a pattern detection module. The operation method includes the following steps: recording respective Nsip values of load instruction and StD instruction by a first field and a plurality of second fields of one of a plurality of first entries of the first AQ module respectively; recording the respective Nsip values of the load instruction and StA instruction by a third field and a plurality of fourth fields of one of a plurality of second entries of the second AQ module respectively; and when the Nsip value of the StD instruction of the first AQ module is matched and the Nsip value of the StA instruction of the second AQ module is matched, determining that the load instruction depend on the StD instruction or the StA instruction by the pattern detection module according to a pattern value corresponding to the StD instruction.

Based on the foregoing, the processor circuit and the operation method thereof of the present disclosure can sequentially record the Nsip values corresponding to the StD instruction and the StA instruction respectively by the two AQ modules and the pattern value, and the pattern value may be set to determine that the load instruction depend on the StD instruction or the StA instruction. Therefore, the processor circuit and the operation method thereof of the present disclosure can effectively reduce a condition of load miss caused by instruction replay.

In order to make the foregoing features and advantages of the present disclosure more obvious and easy to understand, embodiments will be listed below for detailed description in combination with the accompanying drawings.

DESCRIPTION OF THE EMBODIMENTS

In order to make the contents of the present disclosure easier to understand, the embodiments will be listed below as examples according to which the present disclosure may exactly be implemented. In addition, if possible, the elements/components/steps with the same reference signs in the accompanying drawings and implementation modes represent the same or similar parts.

Figure 1:
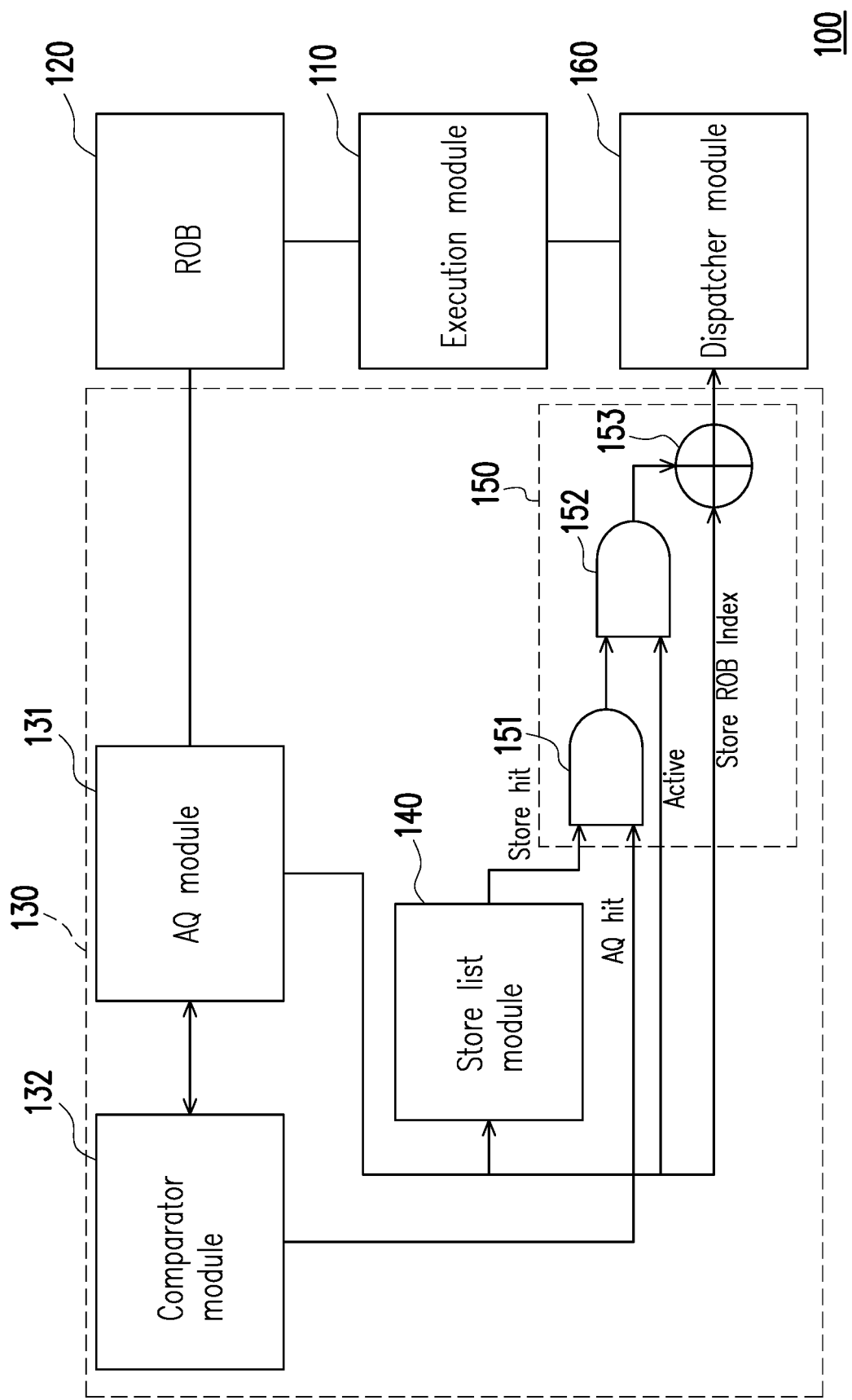
FIG. 1 is a schematic diagram of a processor circuit according to an embodiment of the present disclosure.

FIG. 1 is a schematic diagram of a processor circuit according to an embodiment of the present disclosure. Referring to FIG. 1, the processor circuit 100 includes an execution module 110, an ROB 120, an AQ module 131, a comparator module 132, a store list module 140, a dependency logic 150 and a dispatcher module 160. In the present embodiment, the ROB 120 includes an ROB queue. The execution module 110 is coupled to the ROB 120 and the dispatcher module 160. The ROB 120 is coupled to the AQ module 131. The AQ module 131 is coupled to the store list module 140 and the dependency logic 150. The comparator module 132 is coupled to the AQ module 131 and the dependency logic 150. The dependency logic 150 is coupled to the dispatcher module 160. The dependency logic 150 includes comparison logics 151, 152 and a transfer logic 153. In the present embodiment, the foregoing modules and logics are implemented by a hardware circuit in the processor circuit 100. In an embodiment, the AQ module 131, the comparator module 132, the store list module 140 and the dependency logic 150 are all included in a register alias table (RAT) module 130. The RAT module 130 usually receives instructions from a front end of a processor (not shown), for example, from an instruction decoder, according to a program order, and after executing a specific operation, for example, after mapping an architectural register of the instructions to a physical register, sequentially issues the instructions to the dispatcher module 160 according to the program order. The RAT module 130 of the present disclosure further includes the AQ module 131, the comparator module 132, the store list module 140 and the dependency logic 150 to accurately predict dependency of a load instruction and a store instruction to prevent occurrence of the memory violation.

In the present embodiment, the processor circuit 100 is an out-of-order processor, but the disclosure is not limited thereto. In an embodiment, the processor circuit 100 may be a processing unit of any type, for example, a microprocessor, a central processing unit (CPU) and a microcontroller unit (MCU). In the present embodiment, the processor circuit 100 may also be, for example, a processor configuration of any type, for example, a processing unit integrated onto a chip or an integrated circuit (IC) included and integrated in a system on a chip (SOC).

In the present embodiment, the ROB 120 records a plurality of Nsip values of a plurality of load instructions and a plurality of store instructions. In an embodiment, the ROB 120 records information of a plurality of instructions (including load instructions, store instructions, logic operation instructions and the like) according to an instruction order, and each record takes an ROB index value as an index and takes an Nsip of the instruction and other contents as content. In the present disclosure, when a load instruction causing a memory violation is retired according to the instruction order, the Nsip value of the load instruction causing the memory violation and the corresponding store instruction thereof may be recorded into the AQ module 131. It is important to note that, during iteration processing of loops, the Nsip values of the load instruction and store instruction involved in different iterations are the same but store ROB index values (called index values hereinafter for short) allocated for different iterations are different.

In the present embodiment, during a subsequent iteration, the AQ module 131 receives instructions provided by the instruction decoder of the front end of the processor (not shown), wherein the instructions include load instructions and store instructions. Under a normal condition, if a load instruction depends on a store instruction, the store instruction is positioned before the load instruction in terms of a program order, so that the store instruction may enter the RAT module 130 from the front end of the processor (not shown) earlier than the load instruction. Therefore, first of all, the comparator module 132 determines whether an Nsip value of the store instruction is matched with the Nsip value of the store instruction recorded by the AQ module 131. When the published Nsip value of the store instruction is matched with the Nsip value of the store instruction recorded by the AQ module 131, the AQ module 131 records the store ROB index value of the store instruction and sets a corresponding store active value(Act), wherein it is set to be, for example, "1". Thereafter, when a load instruction enters the RAT module 130, the comparator module 132 determines whether an Nsip value of the load instruction is matched with the Nsip value of the load instruction recorded by the AQ module 131. When the Nsip value of the load instruction is matched with the Nsip value of the load instruction recorded by the AQ module 131, an AQ hit is set, wherein it is set to be, for example, "1".

In an embodiment, the store list module 140 records all the index values allocated to all of the store instructions in the ROB 120 during present iteration, and if an index value of a store instruction recorded by the AQ module 131 is matched with the index value recorded by the store list module 140, it is further verified that the instruction corresponding to the recorded index value is exactly a store instruction, and the store list module 140 generates a store hit signal (Store hit). When all of the active value (Act), the AQ hit signal (AQ hit) and the store hit signal are set (for example, set to be "1"), output of the comparison logic 151 is true, and furthermore, output of the comparison logic 152 is true. It is important to note that, in another embodiment of the present disclosure, the store list module 140 and the comparison logic 151 may also not be included, that is, when the active value and the AQ hit signal are set (for example, set to be "1"), the output of the comparison logic 152 is true.

The dependency logic 150 is responsible for outputting dependency information to the dispatcher module 160. In an embodiment, when the output of the comparison logic 152 is true, the transfer logic 153 outputs the store ROB index value of the store instruction recorded by the ROB 120. When the dispatcher module 160 receives the index value of the store instruction, the dispatcher module 160 dispatches the load instruction, so that the load instruction is dispatched to the execution module 110 for execution after the store instruction. In an embodiment, when the ROB 120 retires the store instruction, the ROB 120 and the store list module 140 may invalidate or delete the index value of the corresponding instruction, so as to accommodate an index value of a new instruction.

Figure 2:
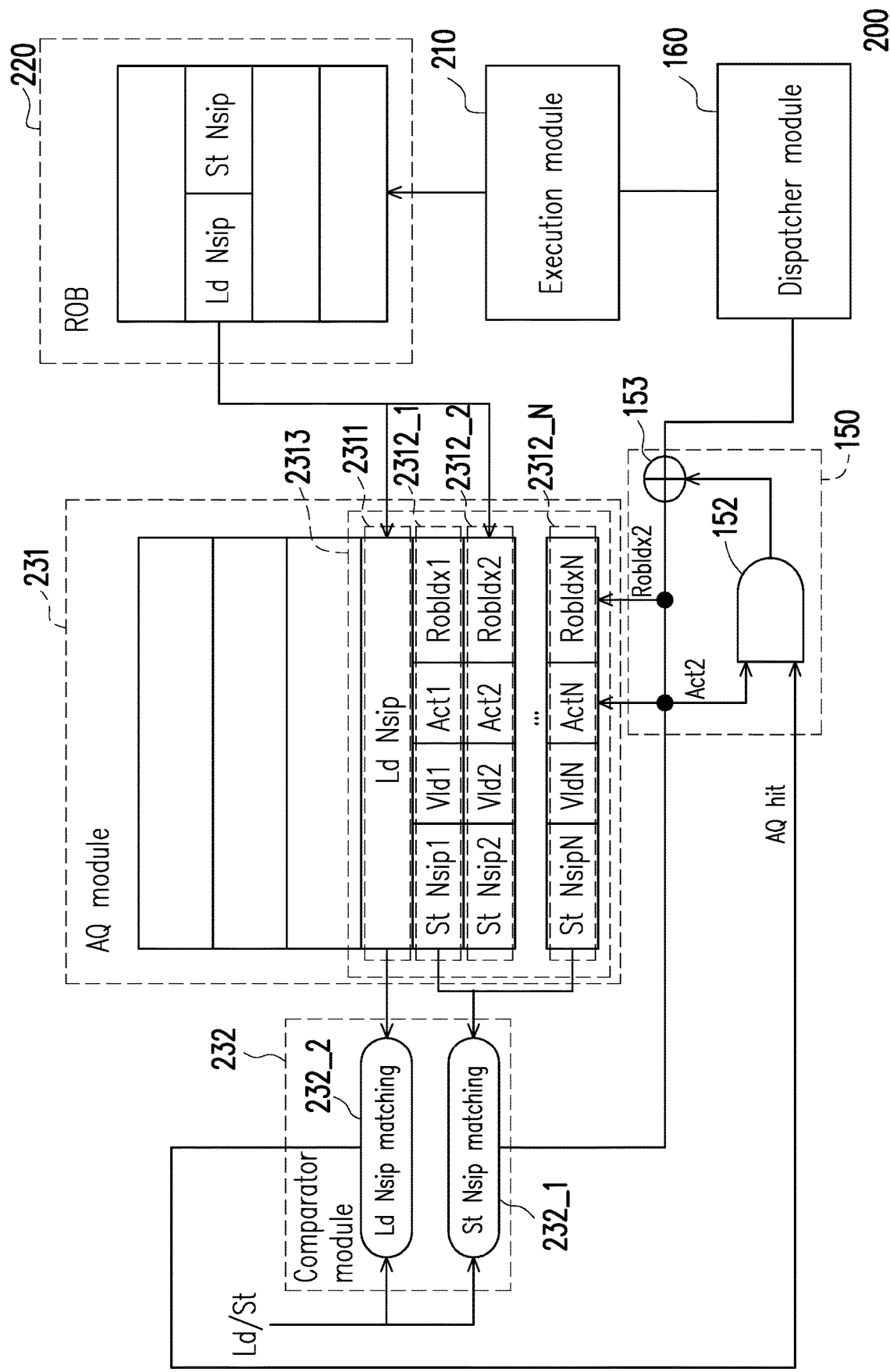
FIG. 2 is a schematic diagram of an AQ module according to a first embodiment of the present disclosure.

FIG. 2 is a schematic diagram of an AQ module according to a first embodiment of the present disclosure. FIG. 2 is an implementation pattern describing the AQ module in the embodiment of FIG. 1 in detail. Referring to FIG. 2, a processor circuit 200 includes an ROB 220 and an AQ module 231. In an embodiment, the processor circuit 200 may further includes a comparator module 232, an execution module 210 and other modules and circuits (for example, a memory module 140, a dependency logic 150 and a dispatcher module 160) shown in FIG. 1. In the present embodiment, the AQ module 231 includes a plurality of entries, wherein each entry 2313 includes a first field 2311 and a plurality of second fields 2312_1, 2312_2~2312_N, wherein N is a positive integer greater than 0. In the present embodiment, the first field 2311 of each entry 2313 is configured to record an Nsip value (Ld Nsip) of a load instruction causing a memory violation, and the second fields 2312_1, 2312_2~2312_N of each entry 2313 are configured to record Nsip values (St Nsip1~St NsipN) of store instructions on which the load instruction depends respectively. In another embodiment, the second fields 2312_1, 2312_2~2312_N are configured to store a plurality of valid values (Vld1, Vld2~VldN), a plurality of Acts (Act1, Act2~ActN) and a plurality of index values (RobIdx1, RobIdx2~RobIdxN) respectively.

How to record the Nsip values recorded by the first field 2311 and second fields 2312_1, 2312_2~2312_N of each entry 2313 will be described below in detail. At first, when a first load instruction and a first store instruction cause a first memory violation and the ROB 220 retires the first load instruction, the AQ module 231 stores the Nsip value (Ld Nsip) of the first load instruction into the first field 2311 of the entry 2313 and stores the Nsip value (St Nsip1) of the first store instruction into one (for example, the second field 2312_1) of the plurality of second fields of the entry 2313. Then, in another scene (for example, iteration of another loop), when a second load instruction and a second store instruction cause a second memory violation and the ROB 220 retires the second load instruction, if the Nsip values of the second load instruction and the first load instruction are equal (for example, both are Ld Nsip), it is indicated that the first and second load instructions are the same load instruction in different scenes (for example, iteration of different loops). Therefore, the AQ module 231 is not required to additionally allocate a new entry to store the Nsip values of the second load and second store instructions. The AQ module 231 is only required to directly stores (or record) the Nsip value (St Nsip2) of the second store instruction into another one (for example, the second field 2312_2) of the plurality of second fields of the entry 2313. In the present embodiment, the processor circuit 200 may further include the other components in the embodiment of FIG. 1, for example, the memory module 140, the dependency logic 150 and the dispatcher module 160, so that the processor circuit 200 may execute related instruction operations mentioned in the embodiment of FIG. 1, and the descriptions thereof are omitted herein.

How to record the Nsip values recorded by the first field 2311 and second fields 2312_1, 2312_2~2312N of each entry 2313 will be described below in detail. In the present embodiment, the execution module 210 determines whether the first load instruction and the first store instruction cause the first memory violation, and in another scene (for example, loop), the execution module 210 further determines whether the second load instruction and the second store instruction cause the second memory violation. Moreover, when the first memory violation occurs, the execution module 210 provides violation information to the AQ module 231 to record index values of the first load instruction and the first store instruction in the AQ module 231. When the second memory violation occurs, the execution module 210 similarly provides violation information to the AQ module 231 to record index values of the second load instruction and the second store instruction in the AQ module 231. It is important to note that, in an embodiment, the index values of the first load instruction and the first store instruction and the index values of the second load instruction and the second store instruction may be recorded in some registers (not shown) in the AQ module 231 to identify that the instructions cause the memory violations during the current iteration of the current loop, so that when the ROB 220 subsequently retires the instructions, the AQ module 231 may determine whether to update the first fields 2311 and second fields 2312 of the corresponding entries in the AQ module 231 with their Nsip values.

Operations when the ROB 220 retires store instructions will be described below in detail, wherein operations when the first store instruction and the second store instruction are retired are similar. Since a store instruction may be positioned before a load instruction depending on the store instruction in terms of a program order and the ROB 220 retires the instructions according to the program order, the store instruction may be retired earlier than the load instruction depending on the store instruction. In an embodiment, when the ROB 220 retires the first/second store instruction, if it is determined that an index value of the retired store instruction is matched with the index value of the load instruction recorded in the AQ module 231, it is indicated that the presently retired store instruction involves a memory violation and the AQ module 231 temporarily stores the Nsip (St Nsip1) of the first/second store instruction, for example, temporarily storing it in some registers (not shown) in the AQ module 231.

In another embodiment, after occurrence of the first memory violation or the second memory violation, the execution module 210 may provide the violation information to the ROB 220 to cause the ROB 220 to make a mark in an ROB entry corresponding to the store instruction and load instruction causing the memory violation. When the ROB 220 subsequently retires the first store instruction or second store instruction containing the mark, the ROB 220 temporarily stores the Nsip value (St Nsip) of the first store instruction or the second store instruction. For example, as shown in FIG. 2, the ROB 220 temporarily stores the Nsip value of the first store instruction or the second store instruction in the ROB entry corresponding to the first load instruction or the second load instruction. It is important to note that the ROB entry corresponding to the first load instruction or the second load instruction originally stores the Nsip value (Ld Nsip) of the first load instruction or the second load instruction.

Operations when the ROB 220 retires load instructions in different scenes will be described below in detail, wherein operations when the first load instruction and the second load instruction are retired are different. When the ROB 220 retires the first load instruction causing the first memory violation, if it is determined that the index value of the retired first load instruction is matched with the index value of the load instruction recorded in the AQ module 231, it is indicated that the presently retired load instruction involves a memory violation and the AQ module 231 then stores the Nsip (Ld Nsip) of the first load instruction into the first field 2311 in the AQ module 231 and stores the Nsip (St Nsip1), temporarily stored before, of the first store instruction into one of the plurality of second fields 2312_1, 2312_2~2312_N in the AQ module 231 for example, the second field 2312_1. It is important to note that the Nsip (St Nsip1), temporarily stored before, of the first store instruction is temporarily stored when the first store instruction is retired. As previously mentioned, in an embodiment, the Nsip (St Nsip1) may be temporarily stored in a certain register of the AQ module 231. In another embodiment, the Nsip (St Nsip1) may also be temporarily stored in the ROB entry corresponding to the first load instruction in the ROB 220. In the present embodiment, the second fields 2312_1, 2312_2~2312_N further include a plurality of valid values (Vld1, Vld2~VldN). When the Nsip of the first store instruction is recorded into the second field 2312_1, the corresponding valid value (Vld1) may be set at the same time (for example, set to be "1") to represent that the second field 2312_1 is nonnull and is occupied by an Nsip (St Nsip1).

In another scene (for example, loop), when the ROB 220 retires the second load instruction causing the second memory violation, if it is determined that the index value of the retired second load instruction is matched with the index value of the load instruction recorded in the AQ module 231, it is indicated that the presently retired second load instruction involves a memory violation The AQ module 231 further determines whether the Nsip values of the second load instruction and the first load instruction are equal, and if the two are equal (for example, both are Ld Nsip), it is indicated that the first and second load instructions are the same load instruction in different scenes (for example, iterations of different loops). Therefore, the AQ module 231 is not required to additionally allocate a new entry to store the Nsip of the second load/store instruction, and instead, directly stores the Nsip (St Nsip2), temporarily stored before, of the second store instruction into another one, for example, the second field 2312_2, of the plurality of second fields 2312_1, 2312_2~2312_N of the entry which has been allocated before and corresponds to the first load instruction, and the corresponding valid value (Vld2) may be set (for example, set to be "1") to represent that the second field 2312_2 is nonnull and is occupied by an Nsip (St Nsip2).

That is, the AQ module 231 of the present embodiment may sequentially record a plurality of Nsip values of a plurality of different store instructions causing different memory violations with the same load instruction by the second fields 2312_1, 2312_2~2312_N of an entry corresponding to the load instruction. How to schedule a load instruction to be dispatched and executed after a store instruction on which it depends according to related information of a load/store instruction pair recorded by the AQ module 231 and causing a memory violation in a subsequent iteration (or during execution of a subsequent scene), so as to prevent the memory violation caused by occurrence of load miss will be described below in detail.

In the present embodiment, in a subsequent iteration (or during execution of a subsequent scene), comparators 232_1, 232_2 are configured to receive a third store instruction and a third load instruction sent from a front end. Since a store instruction is positioned before a load instruction depending on the store instruction in terms of a program order, in the subsequent iteration, the third store instruction may be sent to the comparator module 232 from the front end of a processor (not shown) earlier than the third load instruction depending on it. It is important to note that, in an embodiment, the AQ module 231 and the comparator module 232 are both implemented in an RAT module (not shown in FIG. 2). When the comparator 232_1 determines that an Nsip value of the received third store instruction is matched with an Nsip value (for example, St Nsip2) of the store instruction recorded in a certain second field (for example, the second field 2312_2) in the plurality of second fields of which the valid values Vld are set (for example, set to be "1") in a previous iteration, the comparator module 232 may set the Act (for example, Act2) (for example, setting it to be "1") of the matched second field (for example, the second field 2312_2) in the AQ module 231 and record an index value (RobIdx2) of the third store instruction during the present iteration. In the present embodiment, the same store instruction or load instruction appearing in different iterations has the same Nsip value but different index values.

It is important to note that a load instruction may depend on the first store instruction during execution of a first loop but may depend on the second store instruction during execution of a second loop. That is, in a scene of alternate execution of the first loop and the second loop, a dependency relationship during each iteration may be different from that of the previous one. That is, if each entry of the AQ module 231 only stores one-to-one load/store instruction pair information, a memory violation may never be accurately predicted. Therefore, an entry 2313 of the AQ module 231 of the present embodiment may record information of a plurality of different store instructions to be selected for the third load instruction which is subsequently sent to determine the specific store instruction correlated with the third load instruction during the present iteration and more comprehensively prevent occurrence of the memory violation.

It is important to note that, if multiple active values (for example, Act2 and Act 5) of a plurality of second fields (for example, 2312_2 and 2312_5) in the same entry 2313 are all set during the current iteration, the active value (for example, Act2) which is latest set is selected for output, so as to subsequently set the third load instruction to depend on the store instruction corresponding to the latest set Act and obtain its index value. Specifically, when the comparator 232_2 determines that the Nsip value of the received third load instruction is matched with an Nsip value (for example, Ld Nsip) recorded in the first field 2311 of a certain entry 2313 in the AQ module 231, the comparator module 232 sets an AQ hit signal (AQ hit), wherein it is set to be, for example, "1". When the active value (for example, Act2) and the AQ hit signal (AQ hit) are set (for example, set to be "1"), output of a comparison logic 152 of the dependency logic 150 is true, and the index value (for example, RobIdx2) stored in the second field 2312_2 corresponding to the said active value (for example, Act2) is output. Moreover, when the dispatcher module 160 receives the index value (for example, RobIdx2) of the store instruction, the dispatcher module 160 schedules the third load instruction to be dispatched to the execution module 210 for execution after the third store instruction. Accordingly, the processor circuit 200 may accurately predict dependency of the third load instruction and the third store instruction.

In addition, for an operation method and implementation details of the other circuit components, for example, the store list module, of the processor circuit 200 of the present embodiment, those skilled in the art may learn about sufficient teachings, suggestions and implementation descriptions by the related descriptions made in combination with the embodiment of FIG. 1, and thus the descriptions thereof are omitted.

Figure 3A:
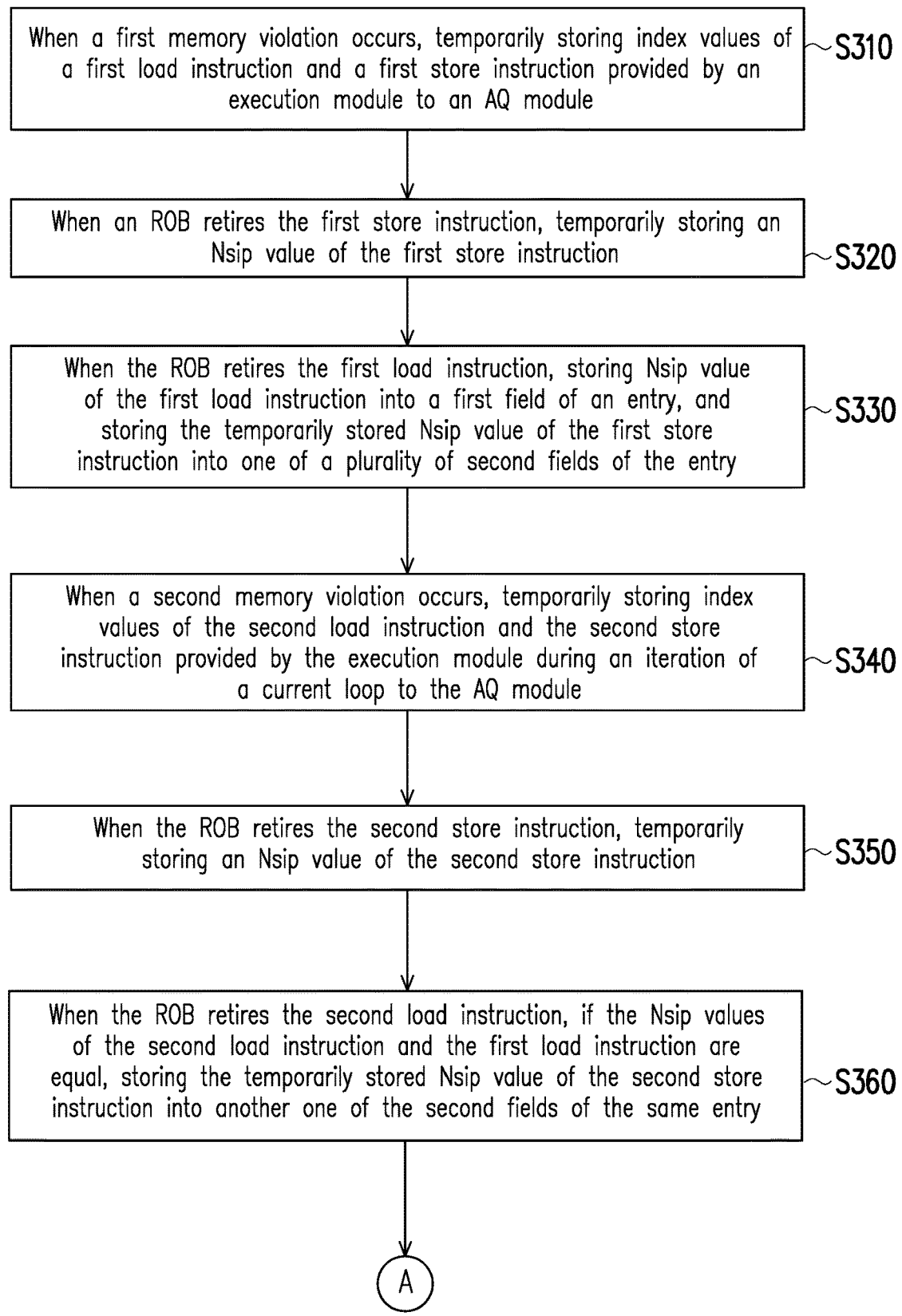
FIGS. 3A and 3B are a flowchart of an operation method according to the first embodiment of the present disclosure.
Figure 3B:
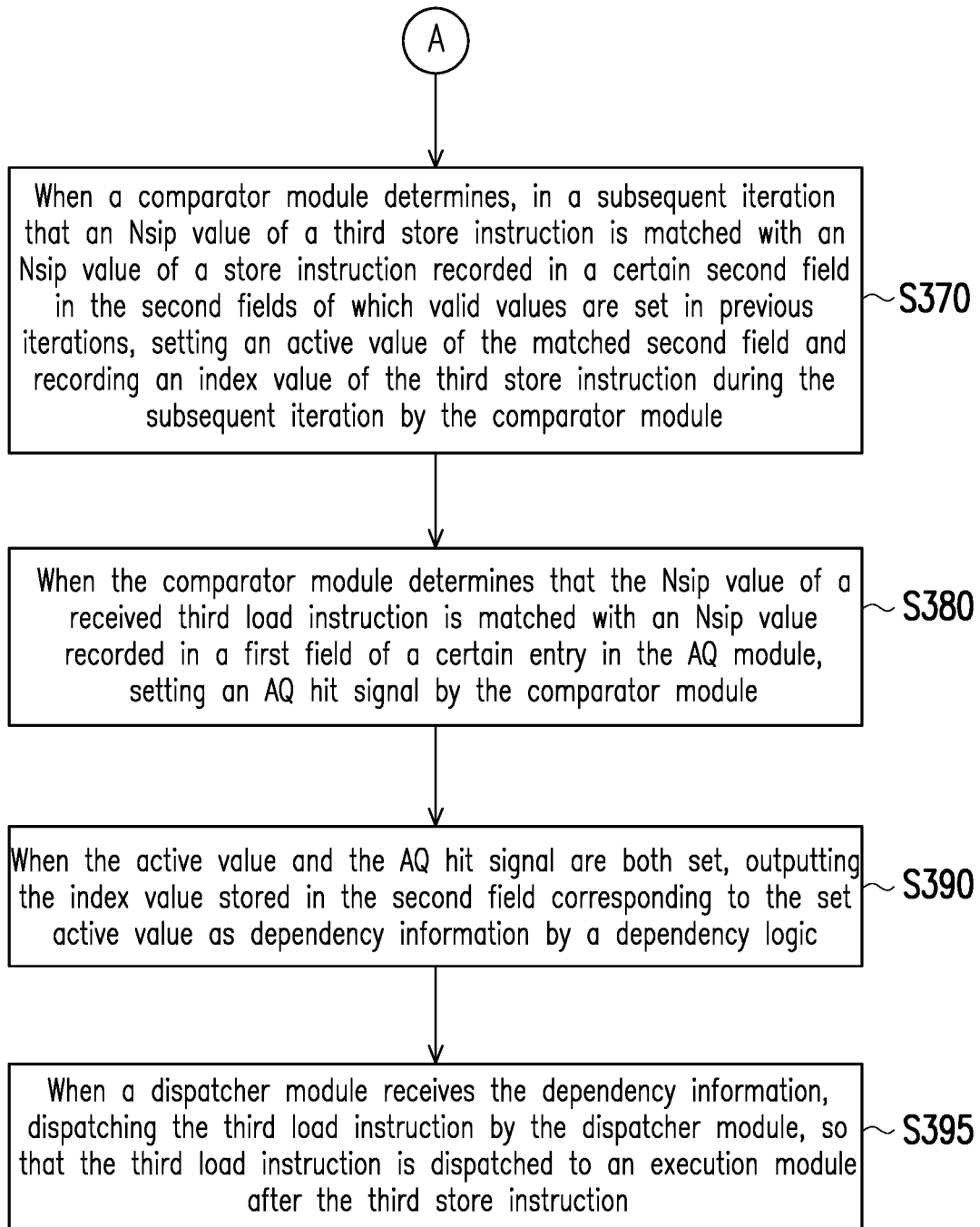

FIGS. 3A and 3B are a flowchart of an operation method according to the first embodiment of the present disclosure. Referring to FIGS. 2 to 3B, the operation method of the present embodiment may be applied to the processor circuit 200 of FIG. 2, and moreover, circuit modules not shown in FIG. 2 may refer to the embodiment of FIG. 1. In Step S310, during an iteration, when a first memory violation (caused by load miss occurring to a first load instruction depending on a first store instruction) occurs, the processor circuit 200 provides, during an iteration and by an execution module 210, index values of the first load instruction and the first store instruction for temporary storage in an AQ module 231 as references used when the processor circuit 200 subsequently updates a first field and second fields of an entry of the AQ module 231. In Step S320, when an ROB 220 retires the first store instruction, an Nsip value (St Nsip1) of the first store instruction is temporarily stored. In Step S330, when the ROB 220 retires the first load instruction, an Nsip value (Ld Nsip) of the first load instruction is stored into a first field 2311 of an entry 2313, and the temporarily stored Nsip value (St Nsip1) of the first store instruction is stored into one (for example, a second field 2312_1) of a plurality of second fields 2312_1, 2312_2~2312_N. In Step S340, during another iteration, when a second memory violation (caused by load miss occurring to a second load instruction depending on a second store instruction) occurs, the processor circuit 200 provides index values of the second load instruction and the second store instruction by the execution module 210 during the iteration of the current loop for temporary storage in the AQ module 231 as references used when the processor circuit 200 subsequently updates corresponding fields of an entry of the AQ module 231. In Step S350, when the ROB 220 retires the second store instruction, an Nsip value (St Nsip2) of the second store instruction is temporarily stored. In Step S360, when the ROB 220 retires the second load instruction, if the Nsip values of the second load instruction and the first load instruction are equal (for example, both are Ld Nsip), the temporarily stored Nsip value (St Nsip2) of the second store instruction is stored into another one (for example, the second field 2312_2) of the second fields 2312_1, 2312_2~2312N of the same entry 2313. In Step S370, when a comparator module 232 determines, in a subsequent iteration, that an Nsip value of a third store instruction is matched with an Nsip value (for example, St Nsip2) of a store instruction recorded in a certain second field (for example, the second field 2312_2) in the plurality of second fields of which valid values are set (for example, set to be "1") in previous iterations, the processor circuit 200 sets an active value (Act2) of the matched second field (for example, the second field 2312_2) by the comparator module 232, and records an index value (RobIdx2) of the third store instruction during the subsequent iteration. In Step S380, when the comparator module 232 determines that the Nsip value of a received third load instruction is matched with an Nsip value (for example, Ld Nsip) recorded in a first field 2311 of a certain entry 2313 in the AQ module 231, the processor circuit 200 sets an AQ hit signal (AQ hit) by the comparator module 232, wherein the set active value (Act2) and the set AQ hit signal (AQ hit) may be set to be, for example, "1". In Step S390, when the said active value (Act2) and the AQ hit signal (AQ hit) are both set (for example, set to be "1"), the processor circuit 200 outputs the index value (for example, RobIdx2) stored in the second field 2312_2 corresponding to the set active value (Act2) by a dependency logic 150 as dependency information. In Step S395, when a dispatcher module 160 receives the dependency information (including the index RobIdx2 of the store instruction), the processor circuit 200 dispatches the third load instruction by the dispatcher module 160, so that the third load instruction s dispatched to the execution module 210 for execution after the third store instruction. Therefore, the operation method of the present embodiment allows the processor circuit 200 can accurately predict dependency of the load instructions and the store instructions.

In addition, for other implementation details and component features of the operation method of the present embodiment, those skilled in the art may learn about sufficient teachings, suggestions and implementation descriptions by the descriptions about the embodiments of FIG. 1 and FIG. 2, and thus the descriptions thereof are omitted.

Figure 4:
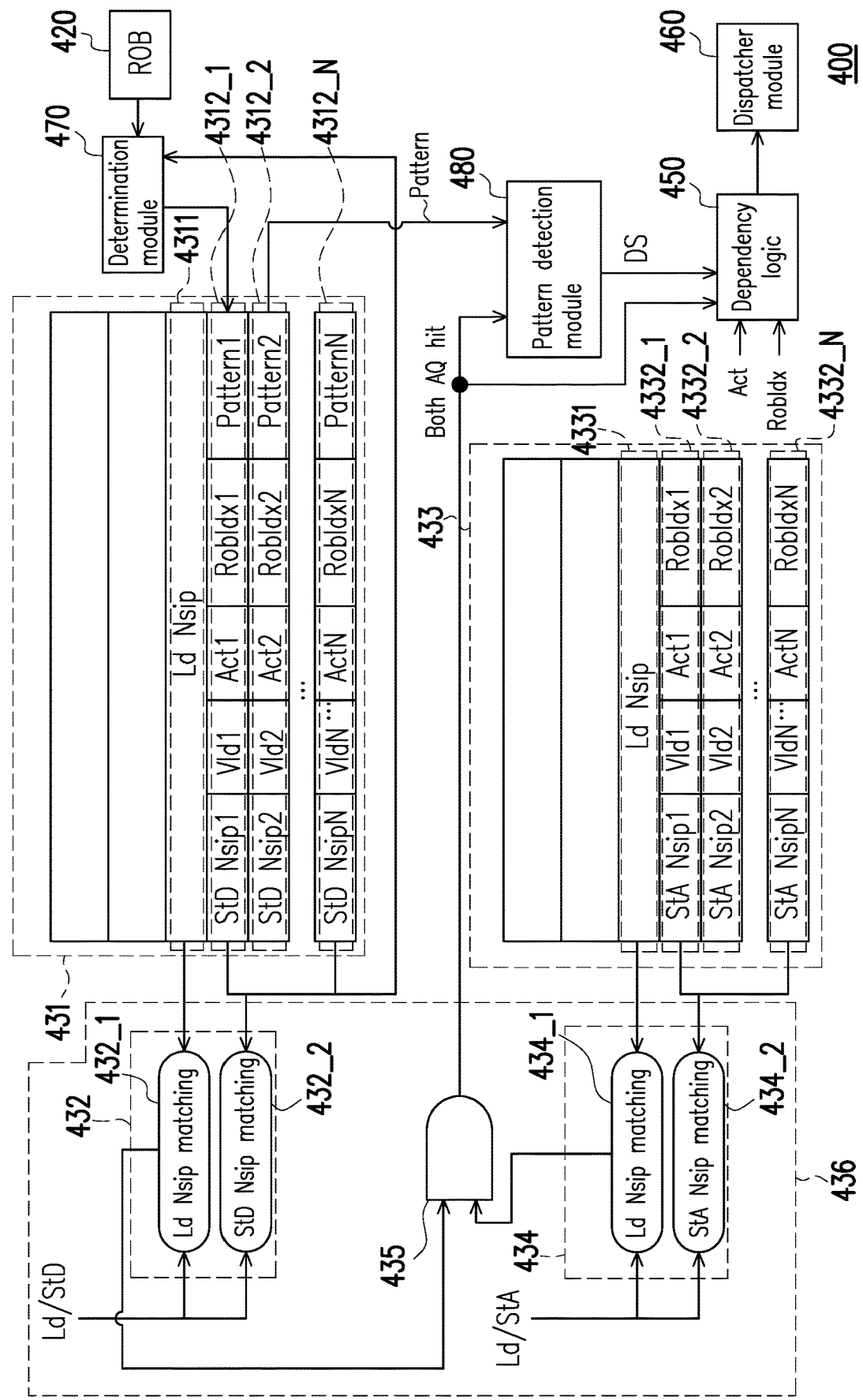
FIG. 4 is a schematic diagram of an AQ module according to a second embodiment of the present disclosure.

FIG. 4 is a schematic diagram of an AQ module according to a second embodiment of the present disclosure. FIG. 4 is another implementation pattern describing the AQ module in the embodiment of FIG. 1 in detail. Referring to FIG. 4, a processor circuit 400 includes two AQ modules 431 and 433 and a pattern detection module 480. In an embodiment, the processor circuit 400 may further include a determination module 470, a comparator module 436, a dependency logic 450 and a dispatcher module 460, and the processor circuit 400 may further include other modules and circuits shown in FIG. 1. In the present embodiment, the first AQ module 431 includes a plurality of entries, wherein each entry includes a first field 4311 and a plurality of second fields 4312_1, 4312_2~4312_N. The first field 4311 is configured to record a Nsip value of a load instruction, and the second fields 4312_1, 4312_2~4312_N are configured to record a plurality of Nsip values of store data (StD) instruction, wherein N is a positive integer greater than 0. the second fields further include a plurality of pattern values, and the pattern values respectively corresponds to the StD instruction corresponding to the second fields. The second AQ module 433 includes a plurality of entries, wherein each entry includes a third field 4331 and a plurality of fourth fields 4332_1, 4332_2~4332_N. The third field 4331 is configured to record Nsip value of the load instruction, and the fourth fields 4332_1, 4332_2~4332N are configured to record a plurality of Nsip values of a store address (StA) instruction.

In the present embodiment, the numbers of the second fields 4312_1, 4312_2~4312N and the fourth fields 4332_1, 4332_2~4332_N may be one or more. For example, each entry of the first AQ module 431 may include only one second field 4312_1, and the second field 4312_1 may only record one Nsip value (StD Nsip1) of one StD instruction (StD) causing a memory violation. Each entry of the second AQ module 433 may include only one fourth field 4332_1, and the fourth field 433_1 may only record one Nsip value (StA Nsip1) of one StA instruction (StA) causing a memory violation.

The pattern detection module 480 is coupled to the first AQ module 431 and the second AQ module 433, and when the Nsip value of an StD instruction of the first AQ module 431 is matched and the Nsip value of an StA instruction of the second AQ module 433 is matched, the pattern detection module 480 determines whether a subsequently received corresponding load instruction (Ld) depends on the StD or depends on the StA according to a pattern value (Pattern) corresponding to the StD instruction with which the Nsip value is matched. In the present embodiment, an Nsip value of the corresponding load instruction (Ld) may also be matched in the first fields in the respective entries, of which Nsip value matching respectively occurs in the second fields, of the first AQ module 431 and second AQ module 433. How to set the patterns will be described below in detail.

In the present embodiment, besides the Nsip values and pattern values of the corresponding StD instructions (StD), the second fields 4312_1, 4312_2~4312_N of the first AQ module 431 further include a plurality of valid values (Vld1, Vld2~VldN), a plurality of active values (Act1, Act2~ActN) and a plurality of index values (RobIdx1, RobIdx2~RobIdxN) of the corresponding StD instructions (StD) respectively. In the present embodiment, besides the Nsip values of the corresponding StA instructions (StA), the fourth fields 4342_1, 4342_2~4412_N of the second AQ module 433 further include a plurality of valid values (Vld1, Vld2~VldN), a plurality of active values (Act1, Act2~ActN) and a plurality of index values (RobIdx1, RobIdx2~RobIdxN) of the corresponding StA instructions (StA) respectively. In the present embodiment, the processor circuit 400 may further include other components of the embodiment of FIG. 1, so that the processor circuit 400 may execute related instruction operations mentioned in the embodiment of FIG. 1, and the descriptions thereof are omitted herein.

In the present embodiment, a store instruction may be an StD instruction or an StA instruction. One macro-instruction of the store instruction sometimes may be translated into two micro-instructions (also called micro-operations μops) by an instruction decoding unit (not shown) at a front end of the processor circuit 400. The two micro-instructions may be an StA instruction (StA) and an StD instruction (StD), wherein the StA instruction (StA) is configured to store an address, and the StD instruction (StD) is configured to store data. All of the load instructions (Ld), the StA instructions (StA) and the StD instructions (StD) may be dispatched to a memory reorder buffer (MOB) (not shown in FIG. 4) for execution by the dispatcher module 460.

In an embodiment, the MOB is disposed in an execution module 110, and if the load instructions (Ld) are completely executed much earlier than the StA instructions (StA) and the StA instructions (StA) are found to have address conflicts with the completely executed load instructions (Ld) after entering the MOB, the StA instructions (StA) may generate replay signals for an ROB 420. Such replay caused by memory violations caused by the load instructions (Ld) and the StA instructions (StA) is called as "MOB Store replay (hereinafter referred to as MS replay)". During MS replay, the load instructions (Ld) and the other instructions depending on the load instructions (Ld) are all required to be re-executed. If detecting that the address conflicts with the StA instructions (StA), the load instructions (Ld) may all keep waiting for the StD instructions (StD) to enter the MOB and then assert a replay signal to the ROB 420 in a complete stage. Such replay caused by memory violations caused by the load instructions (Ld) and the StD instructions (StD) is called as "MOB Load replay (hereinafter referred to as ML replay)". During ML replay, only the other instructions depending on the load instructions (Ld) are required to be re-executed and the load instructions (Ld) is not required to be re-executed.

In the embodiment of FIG. 4, technical details about storing of the Nsip values and valid values of the store instructions into the second fields are similar to the implementation modes of FIG. 1 and FIG. 2. If a memory violation event (for example, ML replay) occurs in a first iteration of a loop, when the ROB 420 retires a corresponding load instruction (Ld) during the first iteration, the first AQ module 431 stores the Nsip value (Ld Nsip) of the load instruction (Ld) into a first field 4311 of the first AQ module 431 and stores the Nsip value (StD Nsip) of an StD instruction (StD) into one (for example, 4312_1) of the second fields 4312_1, 4312_2~4312_N of the first AQ module 431. Then, if a memory violation event (for example, MS replay) occurs in a second iteration of the loop, when the ROB 420 retires a corresponding load instruction (Ld) during the second iteration, the second AQ module 433 stores the Nsip value (Ld Nsip) of the load instruction (Ld) into a third field 4331 of the second AQ module 433 and stores the Nsip value (StA Nsip) of an StA instruction (StA) into one (for example, 4332_1) of the fourth fields 4332_1, 4332_2~4332N of the second AQ module 433.

It is important to note that, during different iterations of loops, the load instruction and store instruction during each iteration have the same Nsip value but different index value respectively. Moreover, ROB indexes (called index values hereinafter for short) of the StD instruction (StD) and the StA instruction (StA) are different, for example, having differences of 1 or 2, and other micro-instructions may be inserted between the index values of the StD instruction (StD) and the StA instruction (StA). It is important to note that specific technical details about how to update the first fields and one of the second fields 4312_1, 4312_2~4312_N of the first AQ module 431, described in this paragraph, in a process of the first iteration may refer to specific technical details about updating of the first fields 2311 and one of the second fields 2312_1, 4312_2~2312N of the AQ module 231 in the implementation mode of FIG. 2. Specific technical details about how to update the third fields and one of the fourth fields 4332_1, 4332_2~4332_N of the second AQ module 433, described in this paragraph, in a process of the second iteration may refer to the specific technical details about updating of the first fields 2311 and one of the second fields 2312_1, 4312_2~2312_N of the AQ module 231 in the implementation mode of FIG. 2. The descriptions thereof are omitted herein. In addition, there is no sequence between the first iteration and the second iteration.

In the present embodiment, the second fields 4312_1, 4312_2~4312_N and the fourth fields 4332_1, 4332_2~4332_N include a plurality of valid values (Vld1, Vld2~VldN) respectively. In the present embodiment, in a process of storing the Nsip value (StD Nsip) of the StD instruction (StD) into one of the second fields 4312_1, 4312_2~4312_N, the corresponding valid value may be set at the same time (for example, set to be "1") to represent that a corresponding address is a nonnull value and is occupied by an Nsip. That is, the first AQ module 431 may sequentially record the Nsip values of the StD instructions on which the load instruction depends by the second fields 4312_1, 4312_2~4312_N.

In the present embodiment, in a process of storing the Nsip value (StA Nsip) of the StA instruction into one of the fourth fields 4332_1, 4332_2~4332_N, the corresponding valid value may be set at the same time (for example, set to be "1") to represent that a corresponding address is a nonnull value and is occupied by an Nsip. That is, the second AQ module 433 may sequentially record a plurality of Nsip values of the StA instructions on which the load instruction depends by the fourth fields 4332_1, 4332_2~4332_N.

When the first iteration and the second iteration are completed, different load/store instruction pairs are recorded for the same load instructions in the first AQ module 431 and the second AQ module 433. In a subsequent process of a third iteration, the load/store instruction pairs recorded in the second AQ module 433 are acquiescently used to cause the load instruction (Ld) to depend on the corresponding StA instructions (StA). This is because, if MS replay occurs, the load instruction (Ld) and the other instructions depending on the load instruction (Ld) are all required to be re-executed and, if ML replay occurs, only the other instructions depending on the load instruction (Ld) are required to be re-executed and the load instruction (Ld) do not need re-executing. That is, the penalty of MS replay is higher than the penalty of ML replay. Therefore, in the process of the third iteration, the load instruction is set to depend on the StA instructions (StA) to avoid occurrence of MS replay as much as possible. That is, a preset priority of the AQ module 433 is higher than that of the AQ module 431.

A specific implementation mode of setting the pattern values in the process of the third iteration will be described below in detail. In the present embodiment, the determination module 470 is coupled to the first AQ module 431 and the ROB 420. The determination module 470 is configured to determine whether ML replay occurs in the process of the third iteration, namely determining whether a load instruction cause replay in the process of the third iteration. Specifically, in the process of the third iteration, when the ROB 420 retires the load instruction, the determination module 470 determinates whether the load instruction cause replay in the process of the third iteration according to whether a ML replay signal is asserted by the load instruction. If the determination module 470 determinates that the said load instruction cause replay during the third iteration, the determination module 470 sets a pattern value corresponding to the StD instruction (StD) in the first AQ module 431. In an embodiment, the pattern values (Pattern1, Pattern2~PatternN) are preset to be, for example, "0" and the set patterns are, for example, "1".

In the present embodiment, the said load instruction may be preset to depend on the StA instructions (StA) set with the latest active value during the third iteration in the fourth fields 4332_1, 4332_2~4332_N of the second AQ module 433. However, when the determination module 470 receives the ML replay signal, the determination module 470 determinates that replay is caused by the said load instruction, the pattern value of the StD instruction set with the latest active value during the third iteration in the second fields 4312_1, 4312_2~4312_N of the first AQ module 431 is set. Therefore, in a process of a subsequent iteration (or a subsequent scene, for example, a fourth iteration), when the comparator module 436 determinates again that an Nsip value of a received StD instruction (StD) is matched in the first AQ module 431, a received StA instruction (StA) is matched in the second AQ module 433 and an Nsip value of the received load (Ld) instruction is matched in both the first AQ module 431 and the second AQ module 433, since the pattern corresponding to the matched StD instruction (StD) in the first AQ module 431 has been set, the pattern detection module 480 outputs a detection signal (DS). Certainly, if the said load instruction does not cause replay (that is, the determination module 470 does not receive the ML replay signal) during the third iteration, then during the fourth iteration, the pattern detection module 480 does not output any detection signal (DS), that is, the load instruction still depend on the matched StA instruction (StA) in the second AQ module 433. Accordingly, the dependency logic 450 of the processor circuit 400 causes the load instruction to depend on the matched StD instruction (StD) (with the latest set active value) in the first AQ module 431 according to the detection signal (DS).

In an embodiment, the dependency logic 450 further decides to set the StD instruction (StD) to depend on the StA instruction (StA) closest to it (i.e., StD) according to the detection signal (DS), that is, to set the StD instruction (StD) to depend on the StA instruction (StA) with smallest differences on the index values. Therefore, the dispatcher module 460 of the processor circuit 400 may dispatches the load instruction, so that the load instruction is dispatched and executed after the StD instruction (StD), and dispatches the StD instruction (StD), so that the StD instruction (StD) is dispatched and executed after the StA instruction (StA), so as to effectively avoid processor violation events and reduce occurrence of load miss.

A specific executing process of a subsequent iteration (or a subsequent scene), for example, the fourth iteration) will be described below in detail. In the present embodiment, the comparator module 436 includes a first comparator 432, a second comparator 434 and a comparison logic 435. The first comparator 432 includes comparators 432_1, 432_2. The second comparator 434 includes comparators 434_1, 434_2. In the present embodiment, the comparators 432_1, 432_2 are configured to, during the subsequent iteration (for example execution of a subsequent scene, for example, the fourth iteration), receive the load instruction (Ld) and the StD instruction (StD). When the comparators 432_1, 432_2 determinate that the Nsip value of the received load instruction (Ld) is matched and the Nsip value of the StD instruction (StD) is matched, the comparator module 432 may set the active value (for example, set to be "1") of the second field corresponding to the Nsip value of the matched StD instruction in the first AQ module 431 and record the index value of the matched StD instruction during this iteration (for example, the fourth iteration) in the second field. In the present embodiment, the same StD instruction appearing in different iterations has the same Nsip value but different index value. In the present embodiment, the AQ module 431 records the index value of the StD instruction during this iteration. Therefore, when the load instruction is set to depend on the StD instruction corresponding to the latest set active value, that is, correct index value of the StD instruction may be obtained.

In the present embodiment, the comparator 434_1, 434_2 are configured to, during a subsequent iteration (or the execution of a subsequent scene, for example, the fourth iteration), receive the load instruction (Ld) and the StA instruction (StA). When the comparator 434_1, 434_2 determinate that the Nsip value of the received load instruction (Ld) is matched and the Nsip value of the StA instruction (StA) is matched, the comparator module 434 may set the active value (for example, set to be "1") of the fourth field corresponding to the Nsip value of the matched StA instruction in the second AQ module 433 and record the index value of the matched StA instruction during this iteration (for example, the fourth iteration) in the fourth field. In the present embodiment, the same StA instruction appearing in different iterations has the same Nsip value but different index value. In the present embodiment, the AQ module 433 records the index value of the StA instruction during this iteration. Therefore, when the load instruction is set to depend on the StA instruction corresponding to the latest set active value, that is, correct index value of the StA instruction may be obtained.

In the present embodiment, when the comparator 432_1 determinates that the Nsip value of the load instruction (Ld) is matched in the first AQ module 431 and the comparator 434_1 determinates that the Nsip value of the same load instruction (Ld) is also matched in the second AQ module 433, the comparison logic 435 outputs a both AQ hit signal (Both AQ hit) to the pattern detection module 480. When the both AQ hit signal and the pattern value are both set, the pattern detection module 480 determines that the load instruction (Ld) depend on the StD instruction (StD) recorded in the first AQ module 431. When the both AQ hit signal is set but no pattern value is set, the pattern detection module 480 determines that the load instruction (Ld) depend on the StA instruction (StA) recorded in the second AQ module 433.

The dependency logic 450 is coupled to the first AQ module 431, the second AQ module 433 and the pattern detection module 480. The pattern detection module 480, when determining that the load instruction (Ld) depend on the StD instruction (StD) recorded in the first AQ module 431, outputs the detection signal (DS) to the dependency logic 450, and the dependency logic 450 outputs the index value (RobIdx) of the StD instruction recorded in the previously matched second field during the present iteration (for example, the fourth iteration) as dependency information according to the active value of the previously matched second field and the both AQ hit signal. Specific implementation details of the dependency logic 450 are similar to the dependency logic 150 in the embodiment of FIG. 1, and the difference is that the dependency logic 450 in the present embodiment selects the active value of one of the second fields from the first AQ module 431 or the active value of one of the fourth fields from the second AQ module 433 according to the detection signal (DS) (for example, when the detection signal (DS) is set to be "1", the active value of the one of the second fields from the first AQ module 431 are selected). The dependency logic 450 confirms that the StD instruction or StA instruction corresponding to the active value appears according to the selected active value (for example, confirming that the StD instruction corresponding to the active value appear according to the active value of the second fields). If the both AQ hit signal is also set, it is confirmed that the corresponding load instruction also appear. Therefore, the dependency logic 450 outputs the index value of the StD instruction recorded in the previously matched second field or the index value of the StA instruction recorded in the previously matched fourth field as the dependency information. The dispatcher module 460 is coupled to the dependency logic 450. When the dispatcher module 460 receives the index value of the StD instruction during the current iteration (for example, the fourth iteration), the dispatcher module 460 dispatches the load instruction, so that the load instruction is dispatched and executed after the StD instruction.

In addition, for an operation method and implementation details of the other circuit components, for example the store list module (not shown in FIG. 4), and the dispatcher module 460 of the processor circuit 400 of the present embodiment, those skilled in the art may learn about sufficient teachings, suggestions and implementation descriptions by the related descriptions made in combination with the embodiment of FIG. 1, and thus the descriptions thereof are omitted.

Figure 5A:
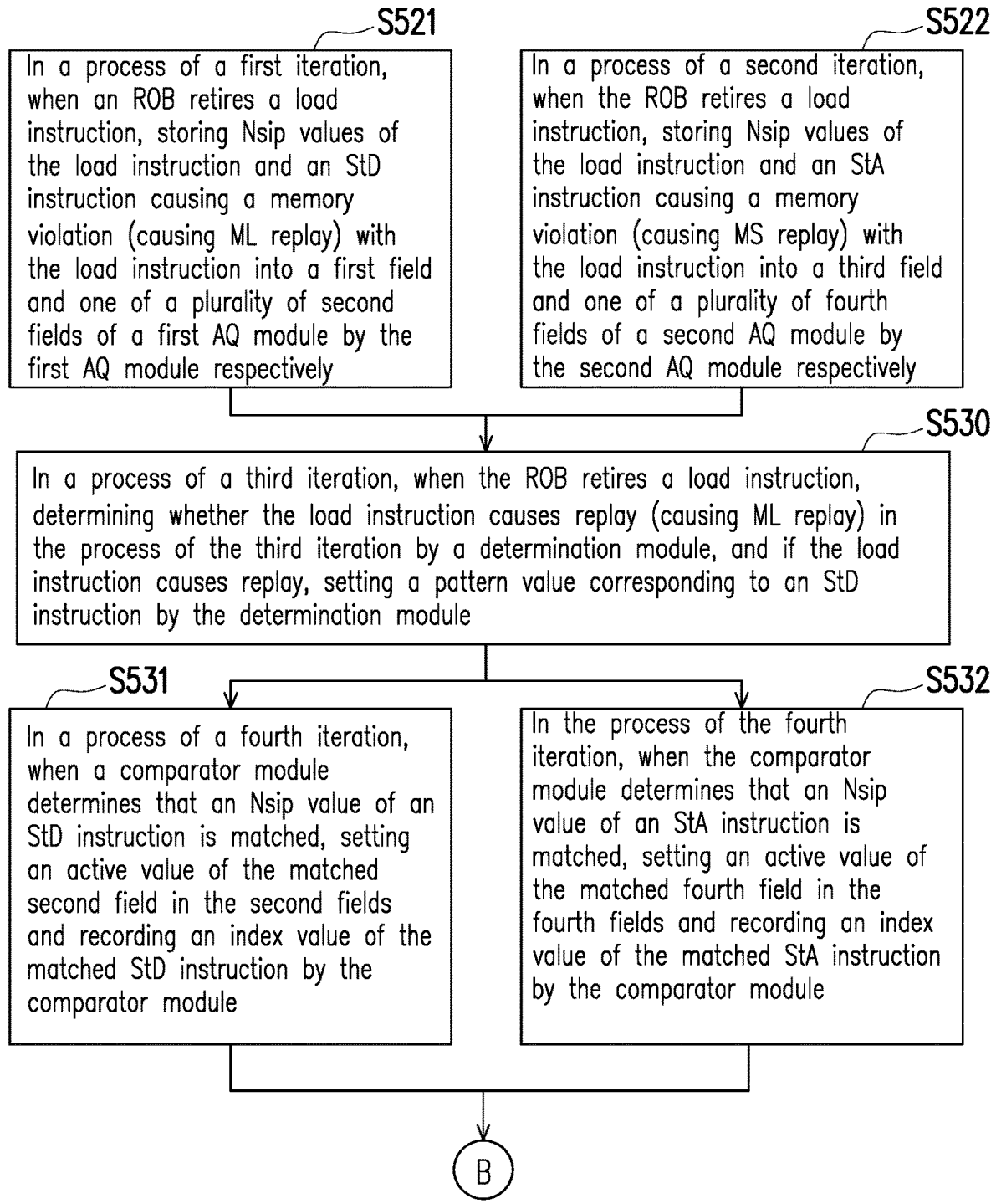
FIGS. 5A and 5B are a flowchart of an operation method according to the second embodiment of the present disclosure.
Figure 5B:
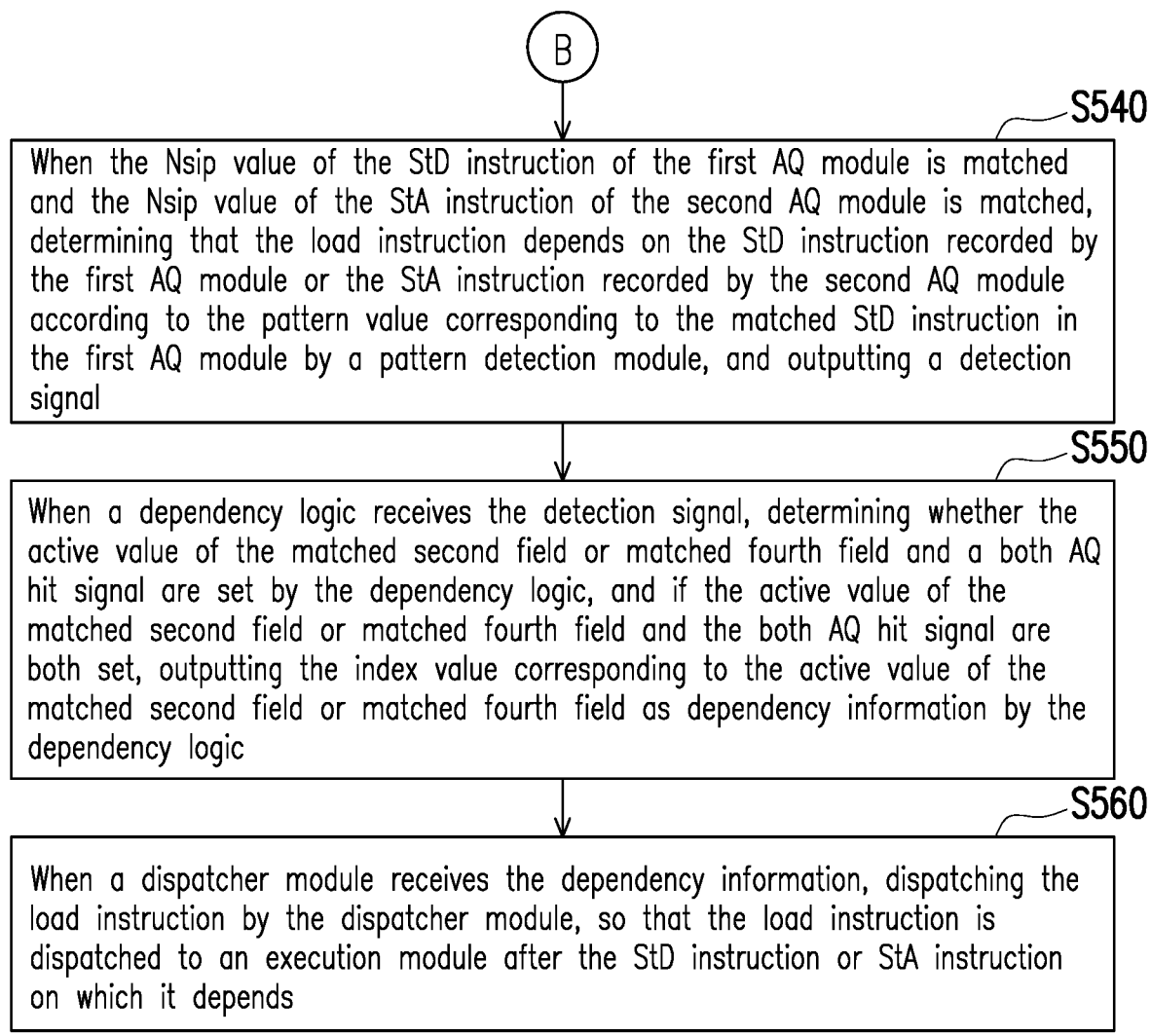

FIGS. 5A and 5B are a flowchart of an operation method according to the second embodiment of the present disclosure. Referring to FIGS. 4 to 5B, the operation method of the present embodiment may be applied to the processor circuit 400 of FIG. 4, and circuit modules not shown in FIG. 4 may refer to the embodiment of FIG. 1. In Step S521, when an ROB 420 retires a load instruction during a first iteration, a first AQ module 431 stores (or records) Nsip value of the load instruction and an StD instruction causing a memory violation (causing ML replay) with the load instruction into a first field 4311 and one of second fields 4312_1, 4312_2~4312_N of the first AQ module 431 respectively.

In Step S522, when the ROB 420 retires a load instruction in a process of a second iteration, a second AQ module 433 stores Nsip value of the load instruction and an StA instruction causing a memory violation (causing MS replay) with the load instruction into a third field 4331 and one of fourth fields 4332_1, 4332_2~4332_N of the second AQ module 433 respectively.

In Step S530, when the ROB 420 retires a load instruction in a process of a third iteration, a determination module 470 determinates whether the load instruction causes replay (causing ML replay) in the process of the third iteration. In an embodiment, whether the load instruction causes replay or not may be determined by determining whether an ML replay signal is generated in an entry, corresponding to the load instruction, of the ROB 420. If the load instruction causes replay, the determination module 470 sets a pattern value corresponding to the StD instruction.

Then, a flow of a fourth iteration is entered. In Step S531, when a comparator module 436 determinates that an Nsip value of an StD instruction is matched in a process of the fourth iteration, the comparator module 436 sets an active value of the matched second field in the second fields 4312_1, 4312_2~4312_N and records an index value of the matched StD instruction. In Step S532, when the comparator module 436 determinates that an Nsip value of an StA instruction is matched in the process of the fourth iteration, the comparator module 436 sets an active value of the matched fourth field in the fourth fields 4332_1, 4332_2~433_N and records an index value of the matched StA instruction. In Step S540, when the Nsip value of the StD instruction of the first AQ module 431 is matched and the Nsip value of the StA instruction of the second AQ module 433 is matched, a pattern detection module 480 determines that the load instruction depends on the StD instruction recorded by the first AQ module 431 or the StA instruction recorded by the second AQ module 433 according to the pattern value corresponding to the matched StD instruction in the first AQ module 431 and outputs a detection signal (DS). In Step S550, when receiving the DS, a dependency logic 450 determinates whether the active value (Act) of the matched second field or fourth field and a both AQ hit signal (Both AQ hit) are set. When the active value (Act) of the matched second field or fourth field and the both AQ hit signal (Both AQ hit) are both set, the index value corresponding to the active value (Act) of the matched second field or fourth field is output as dependency information by the dependency logic 450. In an embodiment, when the comparator module 436 determinates that the Nsip value of the load instruction is matched in both the first field 4311 of the first AQ module 431 and the third field 4331 of the second AQ module 433, the both AQ hit signal (Both AQ hit) is set. In Step S560, when a dispatcher module 460 receives the dependency information, the processor circuit 400 dispatches the load instruction by the dispatcher module 460, so that the load instruction is dispatched to an execution module for execution after the StD instruction or StA instruction on which it depends. Therefore, the operation method of the present embodiment can cause the processor circuit 400 to effectively avoid the condition that the load instruction still causes replay (ML replay) after the load instruction is set to depend on the StA instruction, so as to further reduce occurrence of load miss.

In addition, for other implementation details and component features of the operation method of the present embodiment, those skilled in the art may learn about sufficient teachings, suggestions and implementation descriptions by the descriptions about the embodiments of FIG. 1 and FIG. 4, and thus the descriptions thereof are omitted.

Based on the foregoing, according to the processor circuit and the operation method thereof of the present disclosure, the Nsip values of the store instructions may be sequentially recorded by the AQ module, so that the processor circuit may effectively predict the load instruction and corresponding store instruction, wherein, in a scene where the loops are executed alternately, the load instruction may depend on different store instruction, so that the problem that memory violation of the load instruction may never be accurately predicted in the scene where the loops are executed alternately is solved. Therefore, the processor circuit of the present disclosure may obtain correct index value of the store instruction corresponding to the load instruction. Moreover, according to the processor circuit and the operation method thereof of the present disclosure, the respective Nsip value of StD instruction and StA instruction may also be recorded by two AQ modules respectively, and in combination with setting of pattern values, the processor circuit is enabled to cause the load instruction to depend on the StD instruction or the StA instruction according to setting results of the pattern values. Therefore, the processor circuit of the present disclosure may effectively avoid the condition that the load instruction still cause replay (ML replay) after the load instruction are set to depend on the StA instruction, so as to further reduce occurrence of load miss.

The foregoing description is made to the present disclosure in combination with the embodiments and not intended to limit the present disclosure. Any person with general knowledge about the technical field may make some modifications and embellishments without departing from the spirit and scope of the present disclosure. Therefore, the scope of protection of the present disclosure should be subject to that defined by the appended claims.

What is claimed is:

1. A processor circuit, comprising:
a first alias queue (AQ) module, comprising a plurality of first entries, one of the plurality of first entries comprising a first field and a plurality of second fields configured to record respective next sequential instruction pointer (Nsip) values of load instruction and store data (StD) instruction respectively and also configured to record a pattern value corresponding to the StD instruction;
a second AQ module, comprising a plurality of second entries, one of the plurality of second entries comprising a third field and a plurality of fourth fields configured to record the respective Nsip values of the load instruction and store address (StA) instruction respectively; and
a pattern detection module, coupled to the first AQ module and the second AQ module, when the Nsip value of the StD instruction of the first AQ module is matched and the Nsip value of the StA instruction of the second AQ module is matched, the pattern detection module determines that the load instruction depend on the StD instruction or the StA instruction according to the pattern value corresponding to the StD instruction.

2. The processor circuit according to claim 1, further comprising:
a determination module, coupled to the first AQ module, wherein, during a third iteration, when the load instruction is retired, the determination module determines whether the load instruction causes replay during the third iteration, and if the load instruction causes replay, the determination module sets the pattern value corresponding to the StD instruction, so as to enable the pattern detection module to determine, during a fourth iteration, that the load instruction depends on the StD instruction corresponding to the set pattern value in the first AQ module.

3. The processor circuit according to claim 2, wherein, during the third iteration, the load instruction is set to depend on the StA instruction.

4. The processor circuit according to claim 2, wherein, during the fourth iteration, the pattern detection module further determines that the StD instruction corresponding to the set pattern value in the first AQ module depends on the closest StA instruction.

5. The processor circuit according to claim 2, wherein if the load instruction does not cause replay during the third iteration, the pattern detection module determines, during the fourth iteration, that the load instruction depends on the StA instruction in the second AQ module.

6. The processor circuit according to claim 1, wherein the StD instruction appearing in different iterations has the same Nsip value, wherein the StA instruction appearing in different iterations has the same Nsip value.

7. The processor circuit according to claim 1, further comprising:
a comparator module, coupled to the first AQ module and the second AQ module, when the comparator module determines, during a fourth iteration, that the Nsip value of the StD instruction is matched, the comparator module sets an active value of one of the second fields and records an index value of the StD instruction during the fourth iteration in the one of the second fields.

8. The processor circuit according to claim 7, wherein when the comparator module determines, during the fourth iteration, that the Nsip value of the StA instruction is matched, the comparator module sets an active value of one of the fourth fields and records an index value of the StA instruction during the fourth iteration in the one of the fourth fields.

9. The processor circuit according to claim 7, wherein when the Nsip value of the load instruction is matched in both of the first AQ module and the second AQ module during the fourth iteration, the comparator module outputs a both AQ hits signal.

10. The processor circuit according to claim 9, wherein when the both AQ hit signal and the pattern value are both set, the pattern detection module determines that the load instruction depends on the StD instruction corresponding to the set pattern value in the first AQ module.

11. The processor circuit according to claim 9, further comprising:
a dependency logic, coupled to the first AQ module, the second AQ module and the pattern detection module, wherein when the pattern detection module determines that the load instruction depends on the StD instruction corresponding to the set pattern value in the first AQ module, the dependency logic outputs the index value of the StD instruction recorded in the second field during the fourth iteration as dependency information according to the active value of the second field and the both AQ hit signal.

12. The processor circuit according to claim 10, further comprising:
a dispatcher module, coupled to the dependency logic, wherein when the dispatcher module receives the index value of the StD instruction during the fourth iteration, the dispatcher module dispatches the load instruction, so that the load instruction is dispatched and executed after the StD instruction.

13. The processor circuit according to claim 1, further comprising:
a re-order buffer (ROB), coupled to the first AQ module and the second AQ module, when a memory violation event occurs during a first iteration and the ROB retires the load instruction, the first AQ module stores the Nsip value of the load instruction into the first field of the first AQ module and stores the Nsip value of the StD instruction into the second fields of the first AQ module.

14. The processor circuit according to claim 13, when the memory violation event occurs during a second iteration and the ROB retires the load instruction, the second AQ module stores the Nsip value of the load instruction into the third field of the second AQ module and stores the Nsip value of the StA instruction into the fourth fields of the second AQ module.

15. An operation method, applied to a processor circuit, wherein the processing circuit comprising a first alias queue (AQ) module, a second AQ module and a pattern detection module, the operation method comprising:
recording respective next sequential instruction pointer (Nsip) values of load instruction and store data (StD) instruction by a first field and a plurality of second fields of one of a plurality of first entries of the first AQ module respectively;

recording respective Nsip values of the load instruction and store address (StA) instruction by a third field and a plurality of fourth fields of one of a plurality of second entries of the second AQ module respectively; and when the Nsip value of the StD instruction of the first AQ module is matched and the Nsip value of the StA instruction of the second AQ module is matched, determining that the load instruction depend on the StD instruction or the StA instruction by the pattern detection module according to a pattern value corresponding to the StD instruction.

16. The operation method according to claim 15, wherein the processor circuit further comprising a determination module, the operation method further comprising:

during a third iteration, when the load instruction is retired, determining whether the load instruction causes replay during the third iteration by the determination module, and if the load instruction causes replay, setting the pattern value corresponding to the StD instructions, so as to enable the pattern detection module to determine, during a fourth iteration, that the load instruction depends on the StD instruction corresponding to the set pattern value in the first AQ module.

17. The operation method according to claim 15, wherein the processor circuit further comprising a comparator module and the operation method further comprising:

when the comparator module determines, during a fourth iteration, that the Nsip value of the StD instruction is matched, setting an active value of one of the second fields and recording index value of the StD instruction during the fourth iteration in the second fields by the comparator module; and when the comparator module determines, during the fourth iteration, that the Nsip value of the StA instruction is matched, setting an active value of one of the fourth fields and recording index value of the StA instruction during the fourth iteration in the fourth fields by the comparator module.

18. The operation method according to claim 17, wherein the processor circuit further comprising a dependency logic, the operation method further comprising:

when the Nsip value of the load instruction is matched in both of the first AQ module and the second AQ module during the fourth iteration, outputting a both AQ hit signal by the comparator module;

when the both AQ hit signal and the pattern value are both set, determining the load instruction depends on the StD instruction corresponding to the set pattern value in the first AQ module by the pattern detection module; and when the pattern detection module determines that the load instruction depend on the StD instruction corresponding to the set pattern value in the first AQ module, outputting the index value of the StD instruction recorded in the second field by the dependency logic during the fourth iteration as dependency info illation according to the active value of the second field and the both AQ hit signal.

19. The operation method according to claim 18, wherein the processor circuit further comprises a dispatcher module, the operation method further comprising:

when the dispatcher module receives the index value of the StD instruction during the fourth iteration, dispatching the load instruction by the scheduler module, so that the load instruction is dispatched and executed after the StD instruction.

20. The operation method according to claim 15, wherein the processor circuit further comprises a re-order buffer (ROB), the operation method further comprising:

when a memory violation event occurs during a first iteration and the ROB retires the load instruction, storing the Nsip value of the load instruction into the first field of the first AQ module and storing the Nsip value of the StD instruction into the second fields of the first AQ module by the first AQ module; and when the memory violation event occurs during a second iteration and the ROB retires the load instruction, storing the Nsip value of the load instruction into the third field of the second AQ module and storing the Nsip value of the StA instruction into the fourth fields of the second AQ module by the second AQ module.

* * * * *